(12) United States Patent
Takabayashi

(10) Patent No.: US 9,147,247 B2
(45) Date of Patent: Sep. 29, 2015

(54) THREE-DIMENSIONAL MEASUREMENT APPARATUS, THREE-DIMENSIONAL MEASUREMENT METHOD, AND STORAGE MEDIUM

(75) Inventor: Shiki Takabayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 561 days.

(21) Appl. No.: 13/560,175

(22) Filed: Jul. 27, 2012

(65) Prior Publication Data

US 2013/0046506 A1    Feb. 21, 2013

(30) Foreign Application Priority Data

Aug. 15, 2011  (JP) .................................. 2011-177744

(51) Int. Cl.
*G06F 15/00*     (2006.01)
*G06T 7/00*      (2006.01)
*G01B 11/25*     (2006.01)

(52) U.S. Cl.
CPC ............. *G06T 7/0018* (2013.01); *G06T 7/0057* (2013.01); *G01B 11/2518* (2013.01); *G06T 2207/30204* (2013.01)

(58) Field of Classification Search
CPC ................... G06T 2207/30204; G06T 7/0018; G06T 7/0057; G01B 11/2527; G01B 11/25; G01B 11/2518; G06K 9/2036; G06K 9/00369
USPC ............. 702/86, 94, 127, 150, 152, 153, 154, 702/155, 156, 158; 250/208.1; 356/604, 356/605, 610; 382/141
See application file for complete search history.

(56) References Cited

U.S. PATENT DOCUMENTS

| 8,755,053 | B2 | 6/2014 | Fright et al. |
| 2005/0046873 | A1 | 3/2005 | Suzuki |
| 2006/0219869 | A1* | 10/2006 | Sasaki .................. 250/208.1 |
| 2008/0130015 | A1 | 6/2008 | Lu |

(Continued)

FOREIGN PATENT DOCUMENTS

| CN | 101282687 A | 10/2008 |
| CN | 101667303 A | 3/2010 |

(Continued)

OTHER PUBLICATIONS

Rong-Hua Peng, Yue-Xian Zhong, Wu-Ming Zhang, "Multi-camera Surface Integration in 3-D Non-contect Measurement Systems", Machinery Design & Manufacture, Oct. 2002, pp. 64-65, No. 5, Tsinghua University, Beijing, China.
Nov. 3, 2014 Chinese Office Action in a foreign counterpart application (Chinese Patent Application No. 201210291454.X).

*Primary Examiner* — John H Le
(74) *Attorney, Agent, or Firm* — Fitzpatrick, Cella, Harper & Scinto

(57) ABSTRACT

A three-dimensional measurement apparatus includes a detection unit configured to detect, in an image captured by a capture unit, position information of a pattern on a capture pixel surface, which is projected to a plurality of pattern detection areas preset on the same plane in a measurement space, and a corresponding relationship calculation unit configured to calculate, using the position information, a corresponding relationship between the pattern on a projection pixel surface of a projection unit detected in advance before measurement and the pattern on the projection pixel surface of the projection unit at the time of measurement.

10 Claims, 8 Drawing Sheets

(56) References Cited

U.S. PATENT DOCUMENTS

2012/0287442 A1* 11/2012 Tsuyuki ........................ 356/610
2014/0243619 A1  8/2014 Fright et al.

FOREIGN PATENT DOCUMENTS

| JP | 05-248830 A | 9/1993 |
| JP | 08-054234 A | 2/1996 |

* cited by examiner

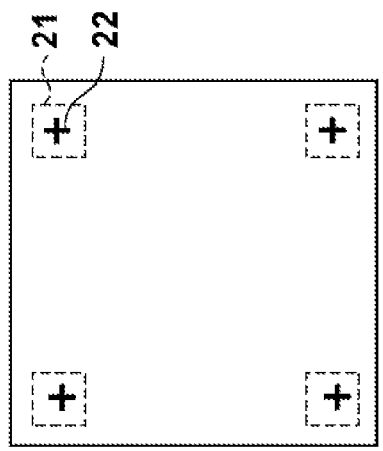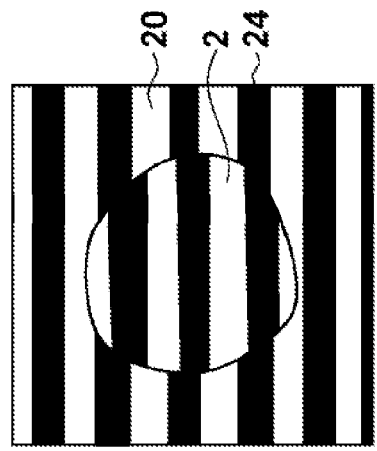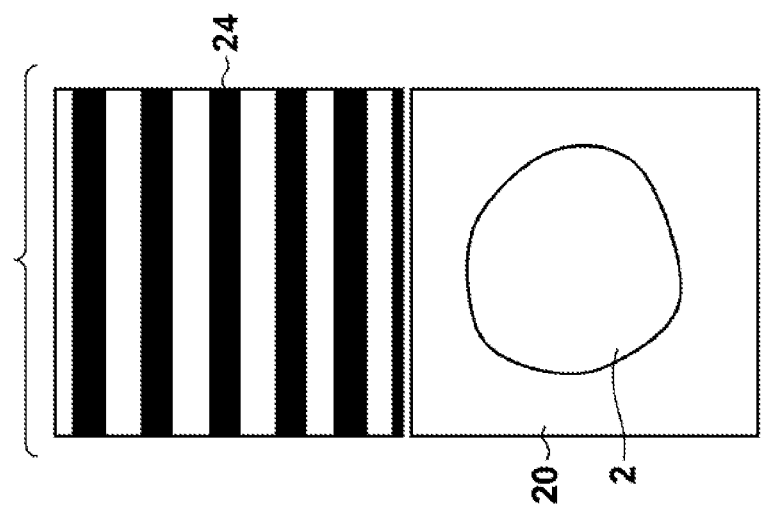

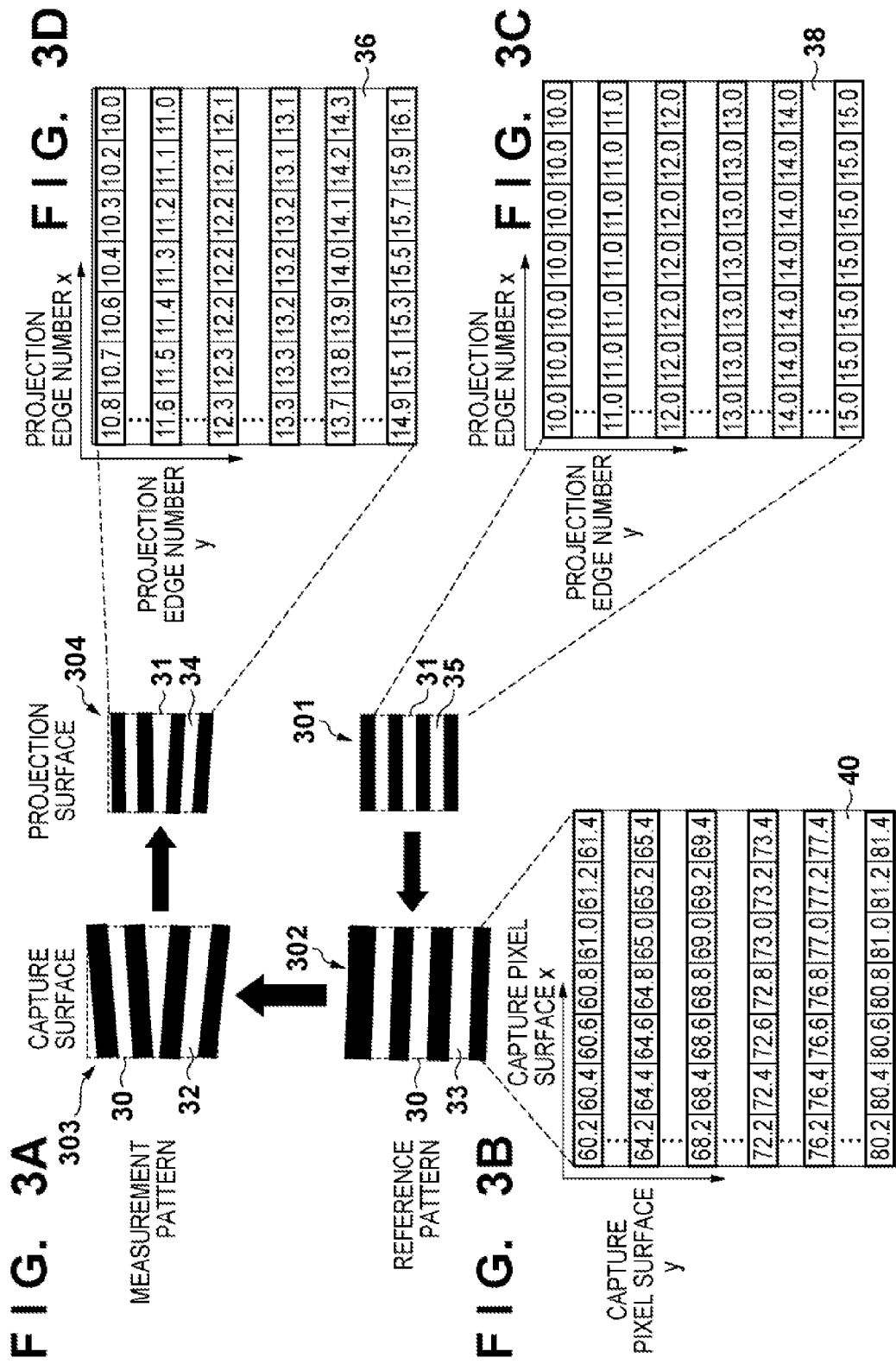

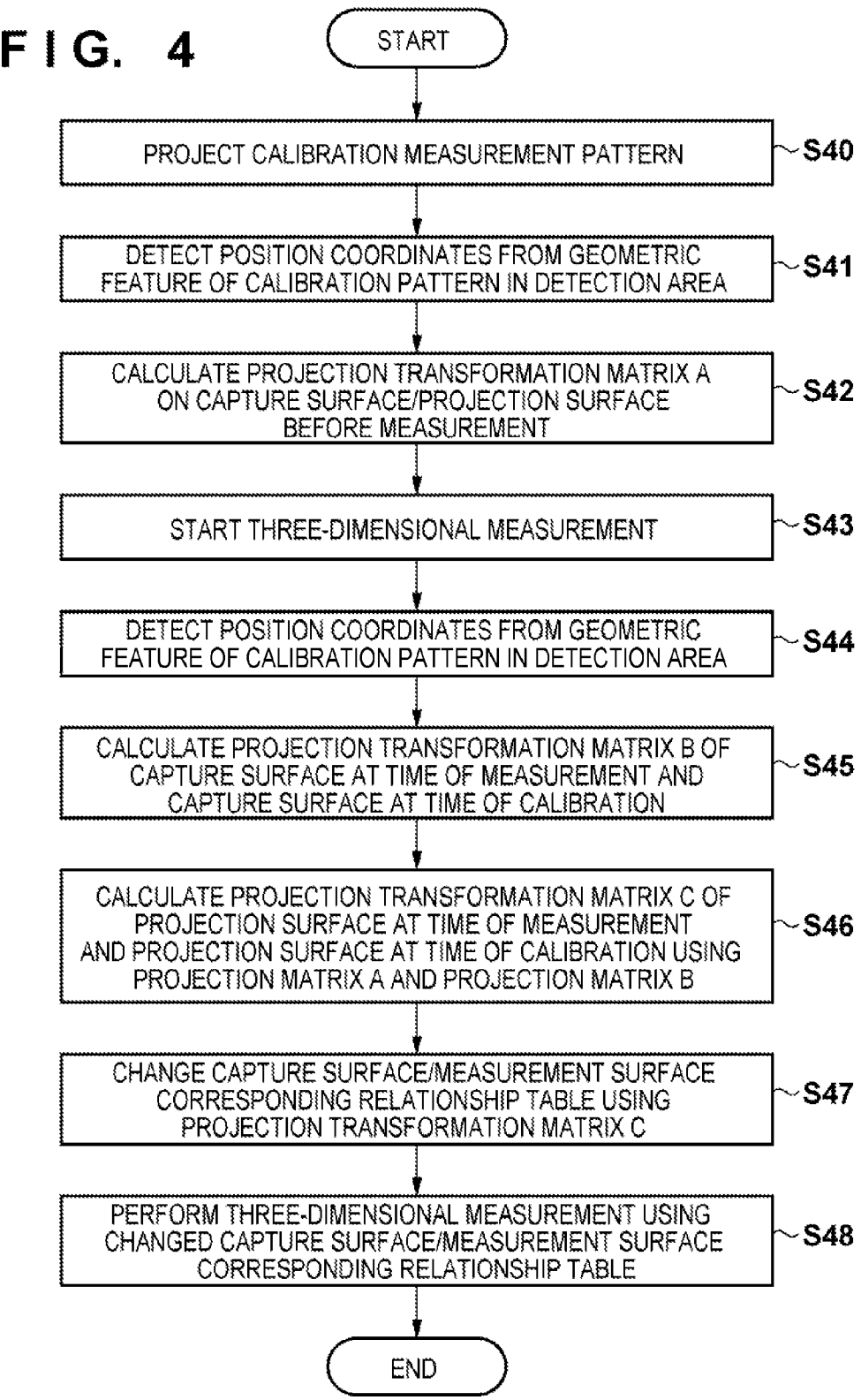

THREE-DIMENSIONAL MEASUREMENT APPARATUS, THREE-DIMENSIONAL MEASUREMENT METHOD, AND STORAGE MEDIUM

BACKGROUND OF THE INVENTION

1. Field of the Invention

The present invention relates to a three-dimensional measurement apparatus capable of calibrating an apparatus error that occurs in the three-dimensional measurement apparatus for measuring the surface shape of an object, a three-dimensional measurement method, and a storage medium.

2. Description of the Related Art

As an apparatus for measuring the surface shape of an object in a noncontact manner, there is conventionally an apparatus that measures the surface shape based on the principle of the triangulation method using a projection unit and a capture unit. This measurement method will be described. First, the projection unit projects a pattern onto the object. Next, the capture unit captures the object with the projected pattern. The position of the pattern on the capture pixel surface of the capture unit is detected from the captured image data. Then, positions on the pattern on the projection pixel surface of the projection unit and positions on the pattern on the capture pixel surface are made to correspond with each other.

The positional relationship between the projection unit and the capture unit is obtained by calibration. For example, the base line length between the projection unit and the capture unit, the rotation/translation information of the capture unit and the projection unit, apparatus specific parameters of the projection unit and the capture unit, the focal length, the optical axis principal point position, the lens aberration values, and the like (to be generically referred to as calibration values) are obtained in advance.

Finally, the distance from the apparatus to the object is measured from the calibration values and the positional relationship between the pattern on the projection pixel surface and that on the capture pixel surface using the principle of the triangulation method. In the apparatus that measures the surface shape of an object using the projection unit and the capture unit, generally, the shapes and arrangement of the devices in use slightly change over time due to, for example, a thermal expansion/contraction effect associated with temperature changes. For this reason, if the temperature readily changes in the measurement environment or the measurement is performed for a long time, the pattern projection position slightly changes. This leads to an error in the result of the surface shape even when the same object is measured under the same conditions.

To solve this problem, Japanese Patent Laid-Open No. 8-054234 proposes a method of calibrating three parameters, that is, the base line length, the projection angle of a projection unit, and the capture angle of a capture unit by arranging a plurality of targets whose distances from a three-dimensional measurement apparatus are accurately known. Japanese Patent Laid-Open No. 5-248830 proposes a method of performing calibration by splitting a measurement beam projected from a projection unit into a three-dimensional measurement apparatus and obtaining the difference between a beam projection position stored in advance and the projection position of the split beam.

In Japanese Patent Laid-Open No. 8-054234, however, the distance between each target and the apparatus needs to be known accurately, and setup in the actual operation is cumbersome. In addition, since the distance between each target and the apparatus itself may change over time, the reliability of calibration values is low. In Japanese Patent Laid-Open No. 5-248830, a new device is added into the apparatus. This poses problems in downsizing and cost of the apparatus.

SUMMARY OF THE INVENTION

The present invention has been made in consideration of the above-described problems, and provides a three-dimensional measurement apparatus capable of calibrating a measurement error.

According to one aspect of the present invention, there is provided a three-dimensional measurement apparatus including a projection unit configured to project a predetermined pattern, and a capture unit configured to capture an object with the projected pattern, comprising: a detection unit configured to detect, in an image captured by the capture unit, position information of the pattern on a capture pixel surface, which is projected to a plurality of pattern detection areas preset on the same plane in a measurement space; and a corresponding relationship calculation unit configured to calculate, using the position information, a corresponding relationship between the pattern on a projection pixel surface of the projection unit detected in advance before measurement and the pattern on the projection pixel surface of the projection unit at a time of measurement.

According to another aspect of the present invention, there is provided a three-dimensional measurement method of a three-dimensional measurement apparatus including a projection unit configured to project a predetermined pattern, and a capture unit configured to capture an object with the projected pattern, the method comprising: a detection step of detecting, in an image captured by the capture unit, position information of the pattern on a capture pixel surface, which is projected to a plurality of pattern detection areas preset on the same plane in a measurement space; and a calculation step of calculating, using the position information, a corresponding relationship between the pattern on a projection pixel surface of the projection unit detected in advance before measurement and the pattern on the projection pixel surface of the projection unit at a time of measurement.

According to the present invention, it is possible to provide a three-dimensional measurement apparatus capable of calibrating a measurement error.

Further features of the present invention will become apparent from the following description of exemplary embodiments (with reference to the attached drawings).

BRIEF DESCRIPTION OF THE DRAWINGS

FIGS. 2A to 2F are views showing examples of projection patterns;

FIGS. 3A to 3D are views for explaining the schematic procedure of calibration and three-dimensional measurement processing by the three-dimensional measurement apparatus;

FIG. 4 is a flowchart for explaining the procedure of calibration and three-dimensional measurement processing by the three-dimensional measurement apparatus according to the first embodiment;

DESCRIPTION OF THE EMBODIMENTS

<First Embodiment>

Figure 1:
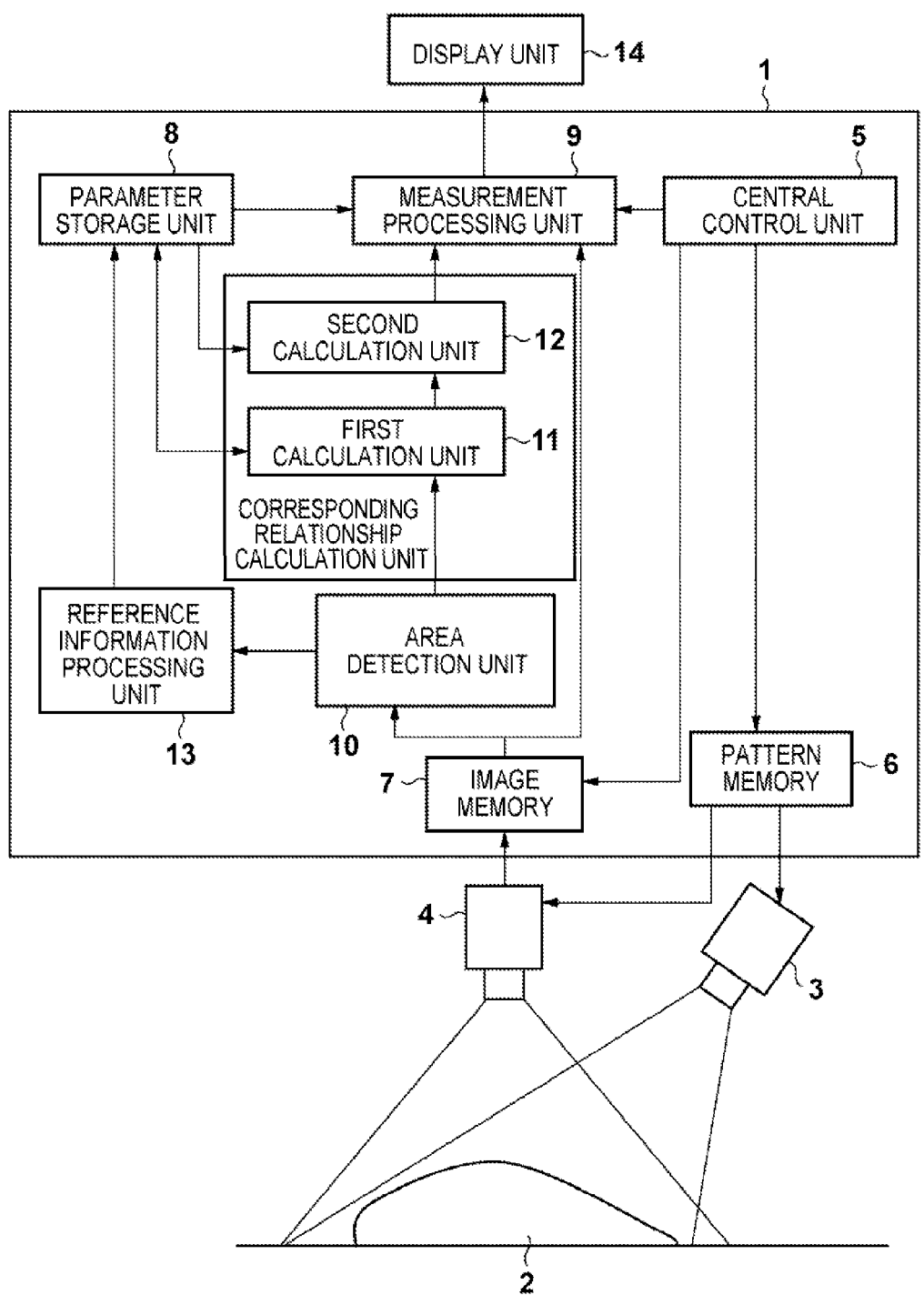
FIG. 1 is a block diagram showing the basic arrangement of a three-dimensional measurement apparatus according to an embodiment.

FIG. 1 is a block diagram showing the basic arrangement of a three-dimensional measurement apparatus according to this embodiment. The basic arrangement of the measurement apparatus includes a projector 3 that projects a pattern onto an object 2, a camera 4 that captures the object 2 with the projected pattern, and a measurement calculation unit 1 that instructs to project and capture the pattern and performs calculation processing of captured image data, thereby performing three-dimensional measurement.

The measurement calculation unit 1 includes a central control unit 5, a pattern memory 6, an image memory 7, a parameter storage unit 8, a measurement processing unit 9, an area detection unit 10, a first calculation unit 11, a second calculation unit 12, and a reference information processing unit 13. These units are connected to each other by a bus so as to send/receive commands and data.

The pattern memory 6 is formed from a storage unit such as a ROM. The pattern memory 6 stores a pattern shape program for setting a pattern to be projected by the projector 3, a time account program for setting the projection time, and the like.

The central control unit 5 has a function of instructing the units belonging to the measurement calculation unit 1. Upon receiving a projection instruction from the central control unit 5, the pattern memory 6 sends a pattern to the projector 3. A plurality of patterns such as a measurement pattern used in three-dimensional measurement, a calibration pattern to calibrate a measurement error, and a calibration measurement pattern used to simultaneously perform three-dimensional measurement and calibration are prepared in the pattern memory 6. The calibration measurement pattern is a combination of the calibration pattern and the measurement pattern. The measurement pattern and the calibration pattern will be described later with reference to FIGS. 2A to 2F. The pattern memory 6 sends one of the patterns in accordance with the instruction from the central control unit 5.

The central control unit 5 has the function of a central control unit for causing the projector 3 to function as a projection unit. A time account signal is sent to the projector 3 and the camera 4 to manage the pattern projection and capture timings. The camera 4 functions as a capture unit for acquiring a captured image.

Image data (captured image) captured by the camera 4 is temporarily stored in the image memory 7. The image memory 7 sends the image data to the measurement processing unit 9 or the area detection unit 10 in accordance with an instruction from the central control unit 5. The procedure of sending to the measurement processing unit 9 is a procedure not to calibrate a measurement error. The procedure of sending to the area detection unit 10 is a procedure of calibrating a measurement error.

In actual processing, the image data undergoes binarization processing, sharpening processing, and the like for three-dimensional measurement processing. These processes are irrelevant to the embodiment, and a description thereof will be omitted. In this embodiment, the image data sent from the image memory 7 is assumed to have undergone necessary processing.

The area detection unit 10 sets, for the image data, a plurality of areas on the same predetermined plane, detects the calibration pattern projected on each area, and detects position coordinates serving as the position information of the pattern for the geometric features of the calibration pattern. The position coordinates as the detection result are represented by coordinates on the coordinate system that plots the pixels of the capture pixel surface of the camera 4. To do error correction as the object, it is necessary to detect the position information of the pattern in advance before measurement and set the reference position. In this embodiment, the reference position of pattern position coordinates is also detected at the time of calibration for obtaining the rotation/translation information of the projector 3 and the camera 4 and calibration values that are the apparatus specific parameters of the projection unit and the capture unit. The detected pattern position coordinates on the capture pixel surface are sent to the reference information processing unit 13. The pattern position coordinates on the capture pixel surface detected at the time of measurement are sent to the first calculation unit 11.

The reference information processing unit 13 calculates the corresponding relationship between the capture pixel surface of the camera 4 and the projection pixel surface of the projector 3 at the time of calibration using the reference position of the pattern position coordinates. The corresponding relationship by the pattern stored in the pattern memory 6 will be described later with reference to FIGS. 3A to 3D. The parameter storage unit 8 is formed from a storage unit such as a ROM or a RAM. The parameter storage unit 8 stores the above-described calibration values. The parameter storage unit 8 also stores the reference position of the pattern position coordinates and the corresponding relationship between the capture pixel surface of the camera 4 and the projection pixel surface of the projector 3 at the time of calibration obtained by the reference information processing unit 13. These parameters are sent to the respective units as needed.

The corresponding relationship calculation unit is divided into the first calculation unit 11 and the second calculation unit 12 to perform the following processing. The first calculation unit 11 acquires the pattern position coordinates on the capture pixel surface at the time of calibration from the parameter storage unit 8 and the pattern position coordinates on the capture pixel surface at the time of measurement from the area detection unit 10. The first calculation unit 11 then obtains the corresponding relationship between the pattern on the capture pixel surface at the time of calibration and that at the time of measurement from the acquired pattern position coordinates on the capture pixel surface at the time of calibration and the pattern position coordinates on the capture pixel surface at the time of measurement. The first calculation unit 11 sends the obtained corresponding relationship to the second calculation unit 12.

The second calculation unit 12 obtains the corresponding relationship between the pattern on the projection pixel surface at the time of calibration and that at the time of measurement. The second calculation unit 12 acquires the corresponding relationship between the capture pixel surface of the camera 4 and the projection pixel surface of the projector 3 at the time of calibration from the parameter storage unit 8. The second calculation unit 12 also acquires the corresponding relationship between the pattern on the capture pixel surface at the time of calibration and that at the time of measurement from the first calculation unit 11. Using the two corresponding relationships, the second calculation unit 12 obtains the corresponding relationship between the pattern on the projection pixel surface at the time of calibration and that at the time of measurement. The calculated corresponding relationship is sent to the measurement processing unit 9.

The measurement processing unit 9 acquires the calibration values from the parameter storage unit 8 and performs three-dimensional measurement by the principle of the triangulation method using the image data. For measurement error calibration according to this embodiment, the corresponding relationship between the pattern on the capture pixel surface and that on the projection pixel surface is changed using a projection transformation matrix C acquired from the second calculation unit 12. The measurement result is generated as three-dimensional measurement data. The three-dimensional measurement data is visualized such that it can be observed as a depth map on a display unit 14 such as a monitor.

Note that some of the functions of the measurement calculation unit 1 can be replaced with an external device including a central control unit and a storage unit that stores computer programs. For example, the reference information processing unit 13 and the parameter storage unit may partially be replaced with the external device, and the values at the time of calibration may be obtained by the external device. In this case, the reference information processing unit 13 and the parameter storage unit are partially removed from the three-dimensional measurement apparatus of this embodiment.

Figure 2D:
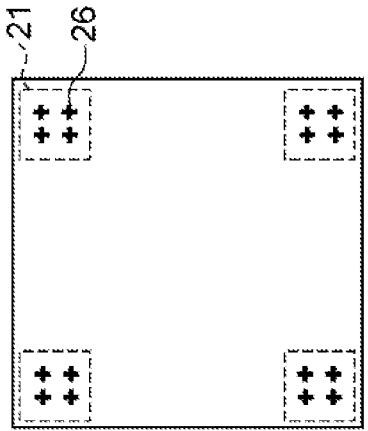

FIGS. 2A to 2F are views showing examples of patterns to be projected. FIG. 2A is a view showing a measurement pattern 24 used in three-dimensional measurement. In this embodiment, a space encoding method will be described as an example of the three-dimensional measurement method. However, the pattern to be projected can be any one of a gray code pattern used in the space encoding method, a pattern having a luminance change used in a phase shift method, and a line pattern used in a light-section method. The measurement pattern 24 has bright portions and dark portions, which are alternately arranged at a predetermined width. There exist a plurality of patterns having different widths of bright portions and dark portions. Each of these patterns is projected. FIG. 2A shows a representative one of the patterns.

The object 2 is placed on a measurement table 20 having a uniform planarity and measured. The measurement pattern 24 is projected to the whole area to be measured. FIG. 2B is a conceptual view showing a state in which the object 2 is placed on the measurement table 20, and the measurement pattern 24 is projected to perform measurement.

FIG. 2C is a view showing calibration patterns 22 to calibrate a measurement error. A plurality of calibration patterns 22 are projected to the outer peripheral portion of the whole area to be measured. The calibration patterns 22 are arranged on the same plane in a measurement space. At least three calibration patterns are necessary. In this embodiment, four calibration patterns 22 are projected to the measurement table 20 to maintain the same planarity. The reason why four calibration patterns are used to maintain the same planarity will be explained concerning an algorithm to be described later.

The calibration pattern 22 employs a shape that facilitates geometric feature detection and enables to detect a shift of two-dimensional coordinates. FIG. 2C illustrates a cruciform pattern as an example. The measurer sets the positions of detection areas 21 (pattern detection areas) at four predetermined corners in advance. Once the positions are set, they are not changed. The calibration patterns 22 are always projected from predetermined pixels on the projection pixel surface of the projector 3. The three-dimensional measurement apparatus automatically detects the calibration patterns 22 in the detection areas 21. For this reason, the detection areas 21 are set within a range larger than the corresponding relationship of an assumed shift, so the calibration patterns 22 do not come out of the detection areas 21. For example, the cruciform pattern may move within the range of several hundred μm to several mm over time in a commercially available projector. Hence, the detection areas 21 can be set to a larger size.

FIG. 2D is a view showing a state in which a calibration measurement pattern 25 that combines the measurement pattern 24 used in three-dimensional measurement and the calibration patterns 22 to calibrate a measurement error is projected. In this algorithm, measurement error calibration can be performed even by sequentially projecting the measurement pattern 24 and the calibration patterns 22. However, three-dimensional measurement and calibration can be done simultaneously by projecting the calibration measurement pattern 25. In this embodiment, the description will be made assuming that the calibration measurement pattern 25 is projected.

Detecting the geometric feature of the calibration pattern 22 will be explained next. The purpose is to detect the geometric feature of the calibration pattern 22 and determine the position coordinates of the calibration pattern from the geometric feature. For this purpose, it is necessary to uniquely determine the coordinates from the geometric feature of the calibration pattern 22. In FIG. 2D, the intersection point of each cruciform pattern is detected as the position coordinates of the calibration pattern 22. The position coordinates determined on the capture pixel surface of the camera 4 will be expressed as (xc, yc) hereinafter. The position coordinates determined on the projection pixel surface of the projector 3 will be expressed as (xp, yp) hereinafter.

Figure 2E:
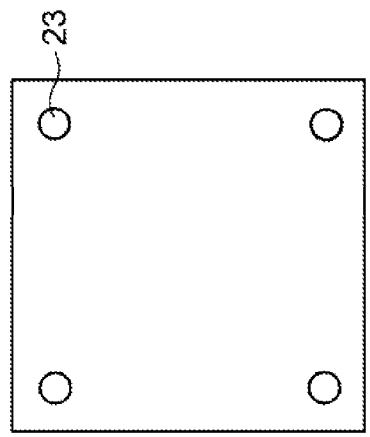

FIG. 2E shows a circular pattern 23 as another example of the calibration pattern 22. The position coordinates obtained from the geometric feature of the circular pattern 23 are the coordinates of the circle center. The circle center is detected from the image data by circle fitting to the circular pattern 23, thereby obtaining the position coordinates of the circular pattern 23 (calibration pattern).

Figure 2F:
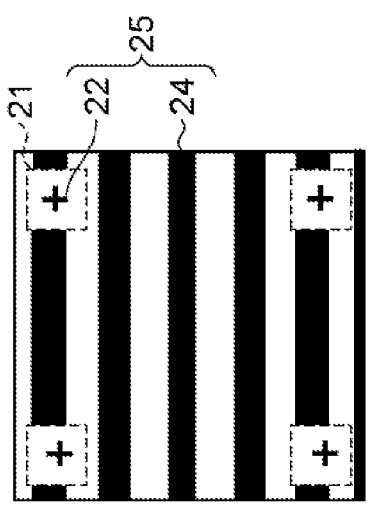

FIG. 2F shows a plurality of cruciform patterns 26 as still another example of the calibration pattern 22. In this case, the geometric feature of each cruciform pattern is the intersection point. The average of the coordinates of the intersection points is representatively determined as the position coordinates. Alternatively, the coordinates of each intersection point are directly used as the position coordinates. As in this example, the position coordinates can be obtained for one or a plurality of points in one detection area 21.

Important is that the position coordinates in the two-dimensional directions can uniquely be determined from the calibration pattern and tracked over time. Any calibration pattern other than those described above can be employed in this embodiment as long as it satisfies those conditions.

In this embodiment, the measurement pattern 24 has been described as a pattern in a one-dimensional direction. However, when performing three-dimensional measurement, a pattern in the remaining one-dimensional direction (in FIG. 2A, the vertical direction) may be projected. In this case, the position coordinates in the two-dimensional directions are determined in the detection area without projecting a calibration pattern different from the measurement pattern 24. That is, the position coordinates of the pattern in the detection area can be obtained using the measurement pattern itself.

FIGS. 3A to 3D are views for explaining the schematic procedure of calibration and three-dimensional measurement processing by the three-dimensional measurement apparatus according to this embodiment. A lower right view 301 of FIG. 3A shows only the measurement pattern out of the calibration measurement pattern projected at the time of calibration, that is, a measurement pattern 35 (reference pattern on the projector side) on a projection pixel surface 31 of the projector. A lower left view 302 of FIG. 3A shows a measurement pattern 33 (reference pattern on the camera side) on a capture pixel surface 30 of camera, which is obtained by projecting the measurement pattern 35 and capturing light reflected by the object surface at the time of calibration.

An upper left view 303 of FIG. 3A shows a measurement pattern 32 on the capture pixel surface 30, which is obtained by projecting the measurement pattern 35 and capturing it at the time of measurement. At the time of measurement, the internal devices of the projector slightly deform due to heat in the projector and the like, and the pattern position is slightly different from that at the time of calibration before measurement. For this reason, even when the projected pattern is the same, an angled pattern is captured as compared to the pattern at the time of calibration, as shown in the upper left view 303. An upper right view 304 of FIG. 3A shows a measurement pattern 34 on the virtual projection pixel surface 31 finally obtained in this algorithm. The actually projected pattern on the projection pixel surface 31 is the pattern shown in the lower right view 301. However, the pattern on the projection surface is virtually changed in accordance with the captured pattern shown in the upper left view 303. This is the processing performed by the algorithm. The corresponding relationship of the shift between the measurement pattern 34 on the projection pixel surface 31 shown in the upper right view 304 and the measurement pattern 35 (lower right view 301) at the time of calibration can be obtained from the corresponding relationship of the shift between the measurement pattern 32 and the measurement pattern 33 on the camera side.

Calibration is performed by shifting the measurement pattern 34 on the projection pixel surface 31 at the time of measurement from the measurement pattern 35 at the time of calibration by the amount of shift of the measurement pattern 32 on the capture pixel surface 30 at the time of measurement from the measurement pattern 33 at the time of calibration. For this purpose, the corresponding relationship of the shift in the overall measurement area is represented by the corresponding relationship of the shift of the position coordinates of the calibration pattern detected in the detection area 21 shown in FIGS. 2C, 2D, and 2F. The method of calculating the corresponding relationship of the shift of the position coordinates of the calibration pattern will be described below. Based on the corresponding relationship of the shift between the measurement pattern 32 on the capture pixel surface at the time of measurement and the measurement pattern 33 at the time of calibration, the measurement processing unit 9 changes a table that numbers the edges of the bright portions and dark portions of the pattern on the projection pixel surface. The table that numbers the edges of the bright portions and dark portions of the pattern on the projection pixel surface will be described with reference to FIGS. 3B to 3D.

The arrows in FIG. 3A indicate the calculation relationship of the algorithm according to this embodiment. First, at the time of calibration, the projection relationship between the measurement pattern 35 on the projection pixel surface 31 of the projector 3 and the measurement pattern 33 on the capture pixel surface 30 of the camera 4 is obtained as the corresponding relationship between the capture pixel surface of the camera 4 and the projection pixel surface of the projector 3 at the time of calibration. This processing is executed by the reference information processing unit 13. A projection transformation matrix A is calculated using position coordinates (xp1, yp1) of the calibration pattern in the detection area 21 on the projection pixel surface 31 and position coordinates (xc1, yc1) of the calibration pattern in the detection area 21 on the capture pixel surface 30 at the time of calibration.

$$\begin{pmatrix} xp1 \\ yp1 \end{pmatrix} = A \times \begin{pmatrix} xc1 \\ yc1 \end{pmatrix} \quad (1)$$

The projection transformation matrix A is represented by two rows×two columns:

$$A = \begin{pmatrix} m11 & m12 \\ m21 & m22 \end{pmatrix}$$

To perform projection transformation, at least four points on the same plane to designate an area to be subjected to projection transformation are necessary. Hence, in this embodiment, the detection areas 21 are arranged at the four corners of the measurement table 20.

Next, the corresponding relationship between the calibration pattern on the capture pixel surface at the time of calibration and that at the time of measurement is obtained. The first calculation unit 11 obtains the projection relationship between the measurement pattern 33 on the capture pixel surface 30 at the time of calibration and the measurement pattern 32 on the capture pixel surface 30 at the time of measurement. A projection transformation matrix B is calculated using position coordinates (xc2, yc2) of the calibration pattern in the detection area 21 on the capture pixel surface 30 at the time of measurement and position coordinates (xc1, yc1) of the calibration pattern in the detection area 21 on the capture pixel surface 30 at the time of calibration.

$$\begin{pmatrix} xc2 \\ yc2 \end{pmatrix} = B \times \begin{pmatrix} xc1 \\ yc1 \end{pmatrix} \quad (2)$$

The projection transformation matrix B is represented by two rows×two columns:

$$B = \begin{pmatrix} n11 & n12 \\ n21 & n22 \end{pmatrix}$$

Using the projection transformation matrix A, the relationship between the measurement pattern 32 on the capture pixel surface 30 and the measurement pattern 34 on the projection pixel surface 31 at the time of measurement can be represented by equation (3).

$$\begin{pmatrix} xp2 \\ yp2 \end{pmatrix} = A \times \begin{pmatrix} xc2 \\ yc2 \end{pmatrix} \quad (3)$$

Next, the corresponding relationship between the calibration pattern on the projection pixel surface at the time of calibration and that at the time of measurement is obtained. The projection relationship between the measurement pattern 34 on the projection pixel surface 31 at the time of measurement and the measurement pattern 35 at the time of calibration is given by equation (4).

$$\begin{pmatrix} xp2 \\ yp2 \end{pmatrix} = C \times \begin{pmatrix} xp1 \\ yp1 \end{pmatrix} = A \times B \times A^{-1} \times \begin{pmatrix} xp1 \\ yp1 \end{pmatrix} \quad (4)$$

A projection transformation matrix C is represented by two rows×two columns:

$$C = \begin{pmatrix} h11 & h12 \\ h21 & h22 \end{pmatrix}$$

From the relationship represented by equation (4), equation (5) is obtained.

$$C = A \times B \times A^{-1} \quad (5)$$

The measurement pattern 35 on the projection pixel surface 31 at the time of calibration is multiplied by the projection transformation matrix C using equation (5), thereby obtaining the measurement pattern 34 at the time of measurement. This processing is executed by the second calculation unit 12.

FIG. 3B is a table showing the edge positions of the bright portions and dark portions of the measurement pattern on the capture pixel surface. FIGS. 3C and 3D are tables showing the edge positions of the bright portions and dark portions of the patterns on the projection pixel surface. The table in FIG. 3B will be referred to as a capture edge position table hereinafter. Each of the tables in FIGS. 3C and 3D will be referred to as a projection edge position table hereinafter.

In a method of obtaining the distance from line positions of the projector, such as the space encoding method, the edge positions of the bright portions and dark portions of the stripes of the measurement pattern serve as measurement values. For this reason, it is necessary to calculate the edge positions on the capture pixel surface and hold them in a table. This is the capture edge position table. FIG. 3B shows a capture edge position table 40 of the measurement pattern 33 at the time of calibration. The values in the table indicate the pixels of the measurement pattern 33 on the capture pixel surface corresponding to the x- and y-coordinate values and have fractional portions to estimate subpixels. In FIG. 3B, for example, edge positions exist from the 60th pixel to the 82nd pixel in the y-direction of the capture pixel surface and are held in the table.

In a method of obtaining the distance by the triangulation method using the projector, positions on the pattern on the projection pixel surface of the projection unit and positions on the pattern on the capture pixel surface need to be made to correspond with each other. A projection edge position table is created for this purpose. This applies not only to the space encoding method but also any other method of obtaining the distance by the triangulation method using the projector. FIG. 3D shows a projection edge position table 36 of the measurement pattern 34. FIG. 3C shows a projection edge position table 38 at the time of calibration. For example, when the number of pixels in the vertical direction (y-direction) of the projector 3 is 768, and each of the bright portions and dark portions has a size of one pixel, 767 edge positions can be obtained at maximum. Hence, the x- and y-coordinate values of the projection edge position table represent the numbers of the edge positions. In FIG. 3C, for example, the 10th to 15th edge positions in the y-direction of the projection pixel surface are held in the table. That is, "10" in the projection edge position table indicates the 10th edge position. Since the projection edge position table in FIG. 3C and the capture edge position table in FIG. 3B make a pair, "10" in the projection edge position table corresponds to the row (60.2-61.4) of "60" with fractional portions in the capture edge position table.

Conventionally, the projection edge position table 36 at the time of measurement (FIG. 3D) holds the same values as in the projection edge position table 38 at the time of calibration (FIG. 3C). In this case, however, a measurement error occurs because the projection edge position table does not correspond to a variation in the pattern position. To prevent this, the projection edge position table is changed using the projection transformation matrix C calculated in FIG. 3A, thereby forming the projection edge position table 36.

This makes it possible to estimate the corresponding relationship of the shift of the whole measurement area on the projection pixel surface from the corresponding relationship of the shift of the position coordinates of the calibration pattern in the detection area 21 and thus change the position coordinates of the pattern in the whole area. This is calibration performed by the measurement processing unit 9. Note that the above-described formulas are merely examples, and a calculation method by another method is also usable. For example, equations (6) and (7) may be used in place of equation (3).

$$\begin{pmatrix} Xp1 \\ Yp1 \end{pmatrix} = D \times \begin{pmatrix} Xc1 \\ Yc1 \end{pmatrix} \quad (6)$$

$$\begin{pmatrix} Xp1 \\ Yp1 \end{pmatrix} = E \times \begin{pmatrix} Xc2 \\ Yc2 \end{pmatrix} \quad (7)$$

From equations (6) and (7), equation (8) is obtained.

$$\begin{pmatrix} Xc2 \\ Yc2 \end{pmatrix} = E^{-1} \times D \times \begin{pmatrix} Xc1 \\ Yc1 \end{pmatrix} \quad (8)$$

As described above, if the values of the matrix obtained by equation (3) are not stable, equation (8) can replace it. The object of this algorithm is to obtain the relationship between the position information (Xp1, Yp1) on the projection pixel surface at the time of calibration and the position information (Xp2, Yp2) on the projection pixel surface at the time of measurement. Hence, all calculation units for obtaining the relationship are incorporated in this embodiment.

FIG. 4 is a flowchart for explaining a procedure of calibrating a measurement error and calculating a three-dimensional distance. This processing is executed under the general control of the measurement calculation unit 1. First, the reference position information of the calibration pattern is acquired. The operator projects and captures the calibration measurement pattern 25 using the measurement apparatus (step S40). The geometric feature of the calibration pattern projected in each preset detection area 21 is detected to obtain position coordinates (step S41). The projection transformation matrix A on the capture pixel surface and the projection pixel surface at the time of calibration is calculated using the position coordinates on the capture pixel surface of the camera 4 and the position coordinates on the projection pixel surface of the projector 3 (step S42).

The procedure executed at the time of calibration has been described above. The detected position coordinates on the capture pixel surface and the projection transformation matrix A are stored in the parameter storage unit 8 of the three-dimensional measurement apparatus.

Next, three-dimensional measurement starts (step S43). The projector 3 projects the same calibration measurement pattern 25 as that at the time of calibration, and the camera 4 captures the object 2 with the projected calibration measurement pattern 25. Position coordinates are detected from the calibration pattern projected in each detection area 21, as in step S41 (step S44). The position coordinates on the capture pixel surface of the camera 4 at the time of calibration are acquired from the parameter storage unit 8. The projection transformation matrix B that defines the projection relationship between the capture pixel surface at the time of measurement and the capture pixel surface at the time of calibration is calculated from the acquired position coordinates and the position coordinates on the capture pixel surface at the time of measurement (step S45).

The projection transformation matrix A calculated in step S42 is acquired from the parameter storage unit 8. The projection transformation matrix C that defines the projection relationship between the projection pixel surface at the time of measurement and the projection pixel surface at the time of calibration is obtained using the acquired projection transformation matrix A and the projection transformation matrix B calculated in step S45 (step S46). The values in the projection edge position table at the time of measurement are multiplied by the calculated projection transformation matrix C, thereby changing the projection edge position table (step S47). Three-dimensional measurement is performed using the new projection edge position table changed in step S47 (step S48).

According to the above-described method, even when the distance value from the three-dimensional measurement apparatus to the detection area is unknown, it is possible to calibrate a measurement error caused by a time-rate change of the devices in use by setting a plurality of detection areas on the same plane and projecting the calibration patterns.

<Second Embodiment>

Figure 5:
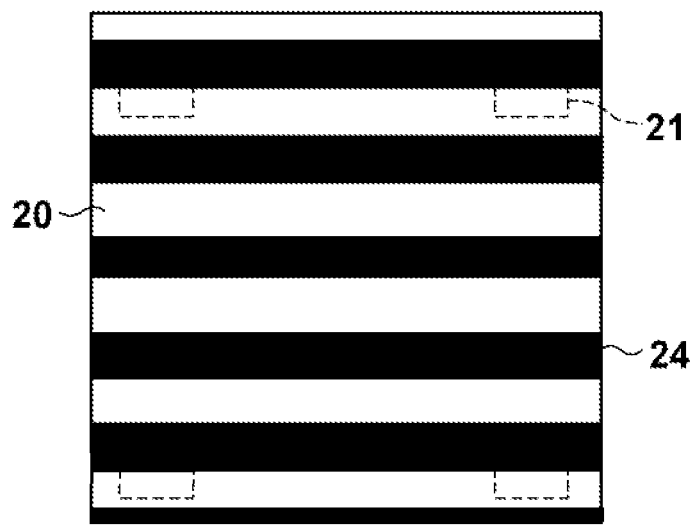
FIG. 5 is a view illustrating a projection pattern according to the second embodiment.

In the second embodiment, a method of performing calibration using not the calibration measurement pattern 25 but only a measurement pattern in a one-dimensional direction in the plane of the measurement area will be described. FIG. 5 is a view illustrating a pattern to be projected as the pattern in the one-dimensional direction. A measurement pattern 24 used for three-dimensional measurement is projected. A plurality of predetermined detection areas 21 are set, and the shift of the measurement pattern 24 in the detection areas 21 is detected. In FIG. 5, since the measurement pattern is a pattern in the horizontal direction, only a shift in the vertical direction with respect to the measurement pattern in the one-dimensional direction can be detected in the plane of the measurement area. When only the measurement pattern in the one-dimensional direction is used, the challenge is coordinate setting in the direction (horizontal direction in FIG. 5) in which detection is impossible. The undetectable coordinates are estimated by linear interpolation.

Figure 6:
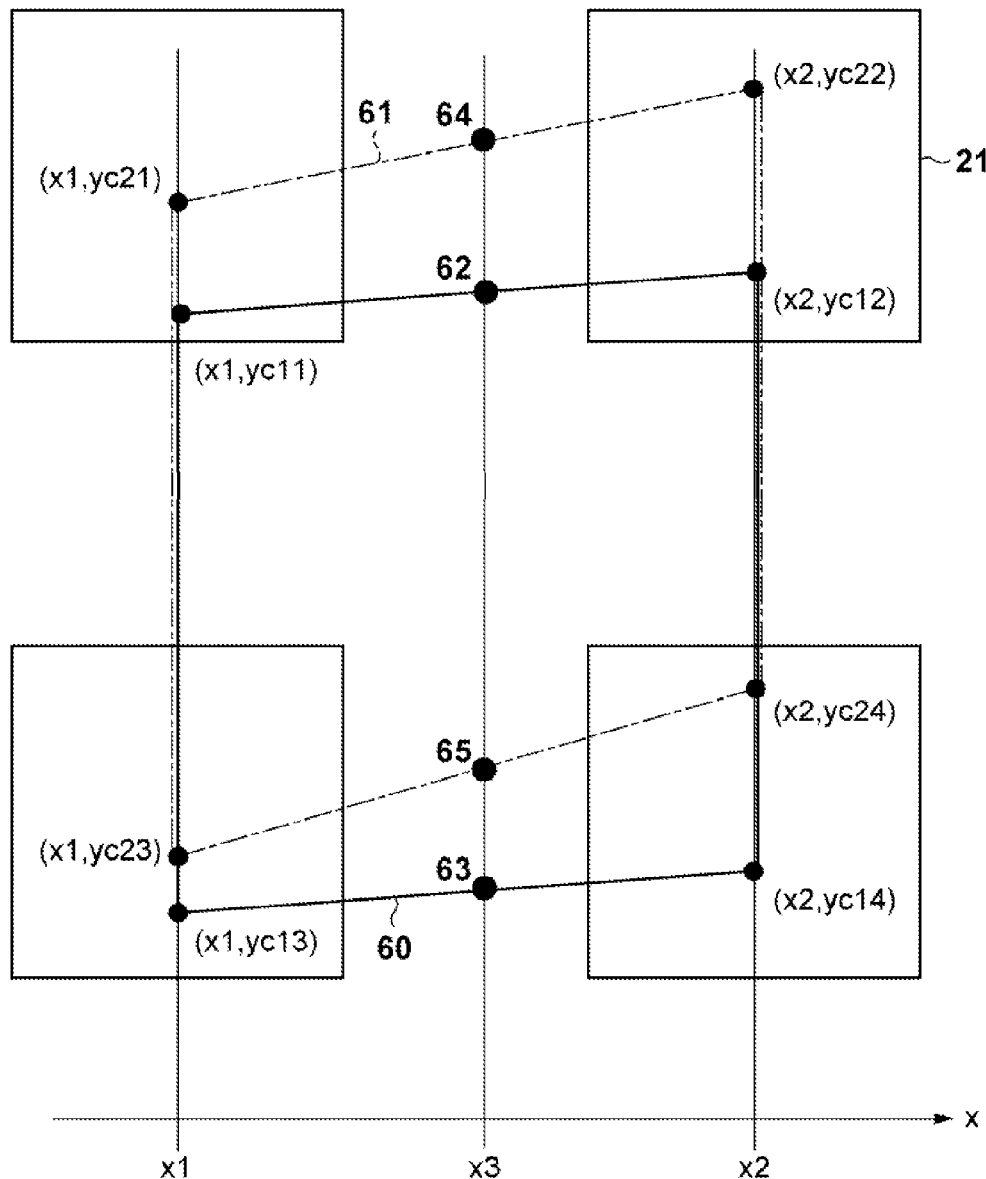
FIG. 6 is a view for explaining linear interpolation according to the second embodiment.

FIG. 6 is a view for explaining the method of estimating coordinates by linear interpolation. FIG. 6 shows coordinates on the image sensor (capture pixel surface) of a camera 4. The description will be made using the position coordinates of four points for the sake of simplicity, although the position coordinates are actually obtained by detecting the geometric feature of the pattern from a plurality of detection points in the detection areas 21. The position coordinates of the four corners are detected by predetermined x-coordinates x1 and x2, and corresponding y-coordinates are obtained. First, the position coordinates of the four points at the time of calibration are defined clockwise from the upper left corner as (x1, yc11), (x2, yc12), (x2, yc14), and (x1, yc13). The four points are connected to obtain a pattern shape 60. The position coordinates of the four points detected from the pattern at the time of measurement are defined clockwise from the upper left corner as (x1, yc21), (x2, yc22), (x2, yc24), and (x1, yc23). The four points are connected to obtain a pattern shape 61.

A first calculation unit 11 estimates the corresponding relationship of the shift of each stripe of the pattern in the detection areas 21 at the four corners from the pattern shapes 60 and 61 using the result of linear interpolation using the position information of the pattern on the capture pixel surface at the time of calibration and at the time of measurement. As the method of estimating the corresponding relationship of the shift, linear interpolation is performed, and the corresponding relationship of the shift is interpolated for each stripe (pattern) of the measurement pattern 24. The linear expressions of the upper and lower sides are obtained from the pattern shapes 60 and 61. To perform interpolation, for example, a point 62 of the upper side of the pattern shape 60, a point 63 of the lower side, a point 64 of the upper side of the pattern shape 61, and a point 65 of the lower side are set in correspondence with an x-coordinate x3. At the position of the x-coordinate x3, the segment between the points 62 and 63 and the segment between the points 64 and 65 have the corresponding relationship. Which coordinate between the points 64 and 65 corresponds to the y-coordinate of each stripe between the points 62 and 63 is one-dimensionally searched for by linear interpolation, thereby interpolating the segment between the points 62 and 63 and the segment between the points 64 and 65. This allows to estimate the corresponding relationship of the shift of each stripe (pattern) from the pattern shapes 60 and 61.

FIG. 6 illustrates an example of linear interpolation on the capture pixel surface of the camera 4. The example of linear interpolation is also applicable when causing a reference information processing unit 13 to calculate a corresponding relationship. The reference information processing unit 13 calculates the corresponding relationship between the capture pixel surface and the projection pixel surface in a direction along the pattern in the one-dimensional direction using the result of linear interpolation using the position information of the pattern on the projection pixel surface and the position information of the pattern on the capture pixel surface.

A measurement processing unit 9 can perform calibration by changing the projection edge position table at the time of measurement based on the corresponding relationship of the shift obtained from the result of linear interpolation by the first calculation unit 11 and the reference information processing unit 13.

According to the above-described method, a measurement error can be calibrated without projecting a special calibration pattern to the detection area. That is, since a measurement error can be calibrated only by setting detection areas and detecting the measurement pattern in each detection area without changing the three-dimensional measurement method to be generally performed, even a conventional three-dimensional measurement apparatus can easily be coped with.

<Third Embodiment>

Figure 7:
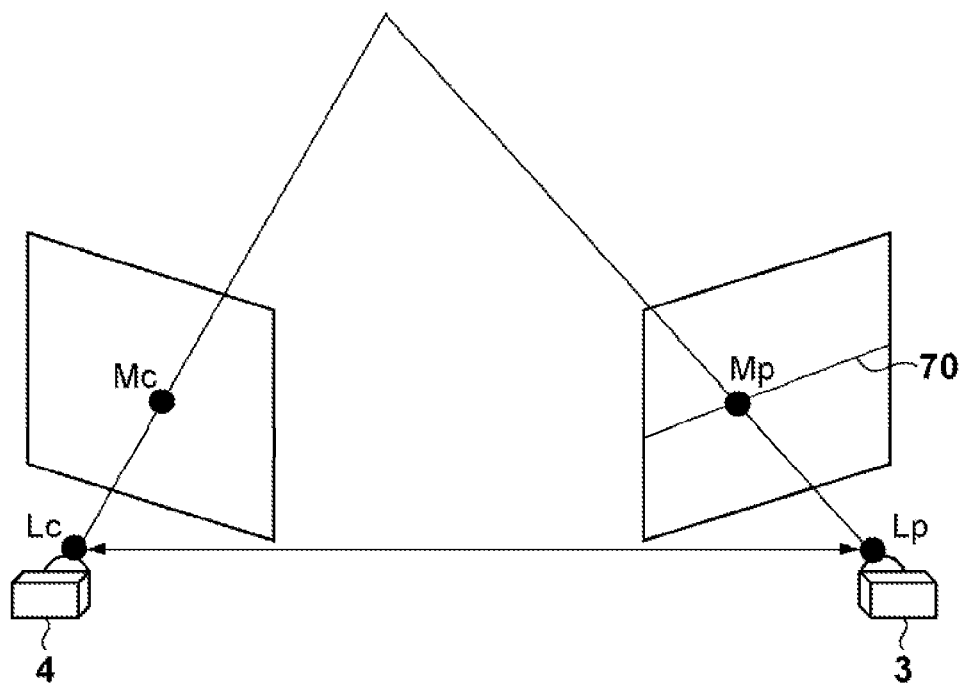
FIG. 7 is a view for explaining epipolar constraint according to the third embodiment.

In the third embodiment, an algorithm will be explained, which uses epipolar constraint for estimating the corresponding relationship of the shift in the horizontal direction with respect to the measurement pattern as well is used in the method of performing calibration using only the measurement pattern in the one-dimensional direction. A reference information processing unit 13 can obtain the corresponding relationship between the capture pixel surface of a camera 4 and the projection pixel surface of a projector 3 using epipolar constraint. The epipolar constraint will be explained first with reference to FIG. 7. As can be seen from the arrangement relationship between the camera 4 and the projector 3 in FIG.

7, an optical axis center Lc of the camera 4, an optical axis center Lp of the projector 3, and corresponding points Mc and Mp on the capture pixel surface of the camera 4 and the projection pixel surface of the projector 3 exist on the same plane. That is, the point Mp exists on a line on which the projection pixel surface of the projector 3 intersects a plane determined by the optical axis centers Lc and Lp of the camera 4 and the projector 3 and the point Mc on the capture pixel surface of the camera 4. This line is called an epipolar line. Restricting the corresponding point search for the camera 4 and the projector 3 on the epipolar line is called epipolar constraint.

When the geometric arrangement of the camera 4 and the projector 3 is known, the epipolar line on the projection pixel surface of the projector 3 for each observation point of the camera 4 is obtained. The corresponding point search is performed on the epipolar line, thereby obtaining the corresponding point on the projection pixel surface for each observation point of the camera 4. Generally, based on a rotation matrix R and a translation matrix T of the camera 4 and the projector 3, an elementary matrix E=T×R is obtained. When Mc=(xc, yc, 1) and Mp=(xp, yp, 1), equation (9) is obtained.

$$(xc \ yc \ 1) \times E \times \begin{pmatrix} xp \\ yp \\ 1 \end{pmatrix} = 0 \quad (9)$$

The algorithm using epipolar constraint will be described next with reference to FIG. 6. The position coordinates (x1, yc11), (x2, yc12), (x2, yc14), and (x1, yc13) of four points at the time of calibration are detected from the measurement pattern in the one-dimensional direction. Additionally, the position coordinates (x1, yc21), (x2, yc22), (x2, yc24), and (x1, yc23) of four points are detected from the pattern at the time of measurement. Position coordinates yp on the projection pixel surface of the projector 3 for the calibration time and measurement time are obtained from the projection edge position table. An elementary matrix E is obtained from the calibration values of the camera 4 and the projector 3. Position coordinates xp on the projection pixel surface of the projector 3 can thus be obtained using equation (6). Since (xc, yc) and (xp, yp) are finally obtained, calibration can be performed as in the first embodiment.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-177744, filed Aug. 15, 2011, which is hereby incorporated by reference herein in its entirety.

What is claimed is:

1. A three-dimensional measurement apparatus including a projection unit configured to project a predetermined pattern, and a capture unit configured to capture an object with the projected pattern, comprising:
a holding unit configured to hold a first relationship between a capture pixel surface of the capture unit and a projection pixel surface of the projection unit at a time of calibration;
a detection unit configured to detect, in an image captured by the capture unit, position information of the pattern on the capture pixel surface, which is projected to a plurality of pattern detection areas preset on the same plane in a measurement space at a time of measurement;
an obtaining unit configured to obtain a second relationship between the position information of the pattern on the capture pixel surface at the time of calibration and the position information of the pattern on the capture pixel surface at the time of measurement;
a corresponding relationship calculation unit configured to calculate, based on the first relationship and the second relationship, a corresponding relationship between the pattern on a projection pixel surface of the projection unit detected at the time of calibration and the pattern on the projection pixel surface of the projection unit at the time of measurement;
a determination unit configured to determine a corresponding relationship between the pattern on the capture pixel surface of the capture unit and the pattern on the projection pixel surface of the projection unit at the time of measurement using the corresponding relationship calculated by the corresponding relationship calculation unit; and
a measurement unit configured to measure a three-dimensional shape of the object based on the determined corresponding relationship.

2. The apparatus according to claim 1, wherein the corresponding relationship calculated by the corresponding relationship calculation unit is projection transformation.

3. The apparatus according to claim 1, wherein the pattern projected to the pattern detection areas is a pattern in a one-dimensional direction in the measurement space.

4. The apparatus according to claim 1, wherein the corresponding relationship calculation unit calculates the corresponding relationship using epipolar constraint.

5. The apparatus according to claim 1, wherein the corresponding relationship calculation unit calculates the corresponding relationship by linear interpolation using the position information of the pattern on the capture pixel surface before the measurement and the position information of the pattern on the capture pixel surface at the time of measurement.

6. The apparatus according to claim 1, wherein the pattern is a stripe pattern including a region of a bright portion and a region of a dark portion.

7. The apparatus according to claim 1, wherein the measurement unit measures the three-dimensional shape of the object by a principle of a triangulation method.

8. The apparatus according to claim 1, wherein the calibration is performed before the measurement.

9. A three-dimensional measurement method of a three-dimensional measurement apparatus, including a projection unit configured to project a predetermined pattern and a capture unit configured to capture an object with the projected pattern, said method comprising:

a holding step of holding a first relationship between a capture pixel surface of the capture unit and a projection pixel surface of the projection unit at a time of calibration;

a detection step of detecting, in an image captured by the capture unit, position information of the pattern on the capture pixel surface, which is projected to a plurality of pattern detection areas preset on the same plane in a measurement space at a time of measurement;

an obtaining step of obtaining a second relationship between the position information of the pattern on the capture pixel surface at the time of calibration and the position information of the pattern on the capture pixel surface at the time of measurement;

a calculation step of calculating, based on the first relationship and the second relationship, a corresponding relationship between the pattern on a projection pixel surface of the projection unit detected at the time of calibration and the pattern on the projection pixel surface of the projection unit at the time of measurement;

a determination step of determining a corresponding relationship between the pattern on the capture pixel surface of the capture unit and the pattern on the projection pixel surface of the projection unit at the time of measurement using the corresponding relationship calculated in the calculation step; and a measurement step of measuring a three-dimensional shape of the object based on the determined corresponding relationship.

10. A non-transitory computer readable storage medium storing a program that causes a computer to execute a three-dimensional measurement method of a three-dimensional measurement apparatus, including a projection unit configured to project a predetermined pattern and a capture unit configured to capture an object with the projected pattern, said method comprising:

a holding step of holding a first relationship between a capture pixel surface of the capture unit and a projection pixel surface of the projection unit at a time of calibration;

a detection step of detecting, in an image captured by the capture unit, position information of the pattern on the capture pixel surface, which is projected to a plurality of pattern detection areas preset on the same plane in a measurement space at a time of measurement;

an obtaining step of obtaining a second relationship between the position information of the pattern on the capture pixel surface at the time of calibration and the position information of the pattern on the capture pixel surface at the time of measurement;

a calculation step of calculating, based on the first relationship and the second relationship, a corresponding relationship between the pattern on a projection pixel surface of the projection unit detected at the time of calibration and the pattern on the projection pixel surface of the projection unit at the time of measurement;

a determination step of determining a corresponding relationship between the pattern on the capture pixel surface of the capture unit and the pattern on the projection pixel surface of the projection unit at the time of measurement using the corresponding relationship calculated in the calculation step; and a measurement step of measuring a three-dimensional shape of the object based on the determined corresponding relationship.

\* \* \* \* \*